US009129521B2

(12) United States Patent
Gannon et al.

(10) Patent No.: US 9,129,521 B2
(45) Date of Patent: Sep. 8, 2015

(54) SYSTEM AND METHOD FOR DISPLAYING A RUNWAY POSITION INDICATOR

(71) Applicant: HONEYWELL INTERNATIONAL INC., Morristown, NJ (US)

(72) Inventors: Aaron Gannon, Anthem, AZ (US); Ivan Sandy Wyatt, Scottsdale, AZ (US); Troy Nichols, Peoria, AZ (US); John G. Suddreth, Cave Creek, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 248 days.

(21) Appl. No.: 13/904,241

(22) Filed: May 29, 2013

(65) Prior Publication Data

US 2014/0354456 A1 Dec. 4, 2014

(51) Int. Cl.

*G01C 21/00* (2006.01)
*G08G 5/00* (2006.01)
*G08G 5/02* (2006.01)

(52) U.S. Cl.

CPC ............ *G08G 5/0047* (2013.01); *G08G 5/0021* (2013.01); *G08G 5/025* (2013.01)

(58) Field of Classification Search

CPC .... G08G 5/0021; G08G 5/0047; G08G 5/025
USPC .......................................................... 340/972
See application file for complete search history.

(56) References Cited

U.S. PATENT DOCUMENTS 5,420,582 A * 5/1995 Kubbat et al. ................. 340/974
5,745,863 A 4/1998 Uhlenhop et al.
5,798,713 A * 8/1998 Viebahn et al. ............... 340/974
6,317,059 B1 * 11/2001 Purpus et al. ................. 340/974
6,711,479 B1 3/2004 Staggs
7,209,053 B2 4/2007 Gannon
7,216,069 B2 5/2007 Hett
8,010,245 B2 8/2011 Nichols et al.
8,027,756 B2 9/2011 Davis et al.
2001/0052562 A1 * 12/2001 Ishihara et al. ............... 244/175
2010/0026525 A1 * 2/2010 Feyereisen et al. ........... 340/972
2010/0250030 A1 * 9/2010 Nichols et al. .................... 701/7
2010/0321488 A1 * 12/2010 Soler ............................. 348/115
2011/0313600 A1 12/2011 Davis et al.

(Continued)

FOREIGN PATENT DOCUMENTS

EP 2557552 A1 2/2013

OTHER PUBLICATIONS

Arents, R.R.D., et al.; Predictive Landing Guidance in Synthetic Vision Displays, The Open Aerospace Engineering Journal, 2011, 4, 11-25.

(Continued)

*Primary Examiner* — Steven Lim
*Assistant Examiner* — Omeed Alizada
(74) *Attorney, Agent, or Firm* — Ingrassia Fisher & Lorenz, P.C.

(57) ABSTRACT

A dynamic runway indicator is displayed overlying a conformal runway for assisting a pilot in completing an approach to landing on a runway. The dynamic runway indicator includes a polygon, that by changing position with respect to the conformal runway, provides advanced instrumentation cues to the pilot for adjusting the aircraft flight path to a normal, or recommended, path to the runway for landing, thereby assisting the pilot to improve the accuracy and safety of the approach and landing.

22 Claims, 15 Drawing Sheets

(56) References Cited

U.S. PATENT DOCUMENTS

| | | | |
|---|---|---|---|
| 2012/0215388 | A1 | 8/2012 | Pepitone et al. |
| 2013/0046462 | A1 | 2/2013 | Feyereisen et al. |

OTHER PUBLICATIONS

EUROCAE; Minimum Aviation System Performance Standards (MASPS) for Enhanced Vision Systems, Synthetic Vision Systems, Combined Vision Systems and Enhanced Flight Vision Systems; ED-179—Dec. 2008.

EP Extended Search Report for Application No. 14167602.3 dated Jan. 7, 2015.

EP Examination Report for Application No. 14167602.3 dated May 22, 2015.

* cited by examiner

SYSTEM AND METHOD FOR DISPLAYING A RUNWAY POSITION INDICATOR

TECHNICAL FIELD

The present invention generally relates to a system for improving a pilot's ability to complete an approach to a runway and more particularly to a system for displaying information to support a pilot's ability to fly a stabilized approach.

BACKGROUND

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. Many airports and aircraft include runway assistance landing systems, for example an Instrument Landing System (ILS), to help guide aircraft during approach and landing operations. These systems allow for the display of a lateral deviation indicator to indicate aircraft lateral deviation from the approach course, and the display of a glide slope indicator to indicate vertical deviation from the glide slope.

Accordingly, it is desirable to provide a system and method for improving the ability to fly low altitude, low visibility approaches including displaying information supporting a pilot's ability to fly a stabilized approach. Furthermore, other desirable features and characteristics of the present invention will become apparent from the subsequent detailed description of the invention and the appended claims, taken in conjunction with the accompanying drawings and this background of the invention.

BRIEF SUMMARY

A dynamic runway indicator is provided for displaying over a conformal runway for assisting a pilot in completing an approach to landing on a runway. The dynamic runway indicator, by changing position with respect to the conformal runway, provides advanced instrumentation cues to the pilot for adjusting the aircraft flight path to a normal, or recommended, path to the runway for landing, thereby improving the accuracy and safety of the approach and landing.

In one exemplary embodiment, the apparatus comprises a vision system for an aircraft, comprising a database storing a position and dimensions of a target runway; a navigation system configured to determine a location of the aircraft; and a display coupled to the database and the navigation system and configured to display a conformal runway representing the target runway and a runway indicator, the conformal runway having an approach end, a departure end, a first side, and a second side, the runway indicator comprising a landing zone on the target runway near the approach end; an outline on the approach end, departure end, first side, and second side of the runway; and a polygon having two sides with a distance therebetween greater than the width of the conformal runway; wherein the navigation system is further capable of continually modifying and emphasizing the position of the polygon based on the position of the aircraft.

In another exemplary embodiment, a vision system for an aircraft comprises a vision system for an aircraft, the vision system comprising a runway database comprising lengths, widths, and locations of a plurality of runways; a navigational system configured to determine data including a position and an altitude of the aircraft, and approach information; and a display coupled to the computer and configured to display the approach information, wherein the approach information comprises a target runway, selected from the plurality of runways, including length and width from the runway database; and a runway indicator comprising a landing zone; an outline surrounding edges of the target runway; and a polygon having two sides with a distance therebetween greater than the conformal runway width, and two ends; wherein the system is further configured to continually modifying the position of the polygon based on the position of the aircraft.

In yet another exemplary embodiment, a method for providing a runway indicator for assisting a pilot of an aircraft to complete an approach for landing comprises providing a location, width, length, and centerline of a runway; determining a position of the aircraft, the position being determined in consideration of at least one of the group consisting of an altitude of the aircraft and a lateral distance of the aircraft from the runway centerline; displaying the runway conformally with respect to the position of the aircraft; providing the runway indicator, comprising displaying a polygon having two sides with a distance therebetween greater than the width of the runway; and continually adjusting the position of the polygon with respect to the conformal runway in accordance with the position of the aircraft.

BRIEF DESCRIPTION OF THE DRAWINGS

The present invention will hereinafter be described in conjunction with the following drawing figures, wherein like numerals denote like elements.

DETAILED DESCRIPTION

Figure 1:
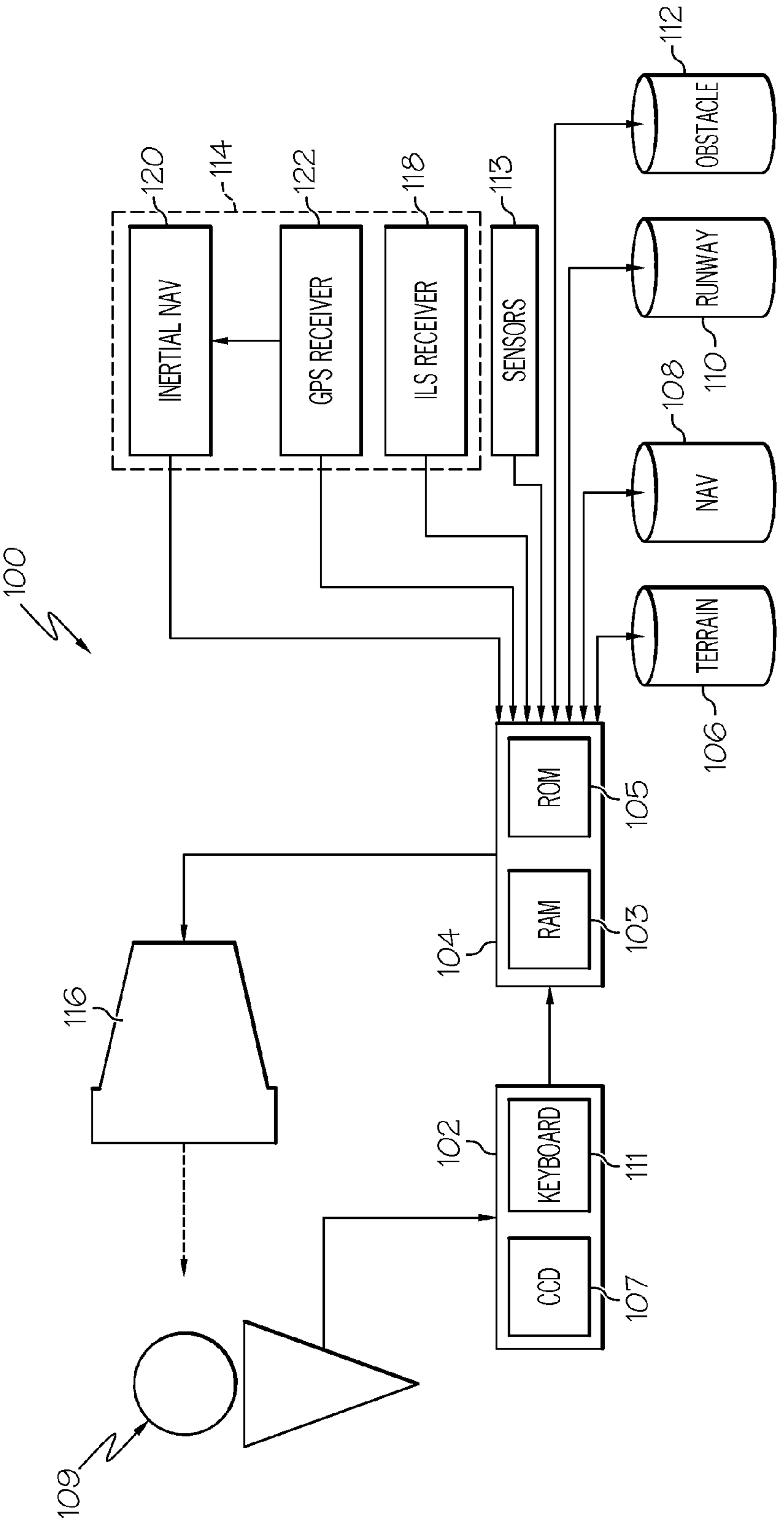
FIG. 1 is a functional block diagram of a known flight display system in according with exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein.

The terms "comprise," "include," "have" and any variations thereof are used synonymously to denote non-exclusive inclusion. The term "exemplary" is used in the sense of "example," rather than "ideal."

In the interest of conciseness, conventional techniques, structures, and principles known by those skilled in the art may not be described herein, including, for example, standard magnetic random access memory (MRAM) process techniques, fundamental principles of magnetism, and basic operational principles of memory devices.

During the course of this description, like numbers may be used to identify like elements according to the different figures that illustrate the various exemplary embodiments.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A dynamic runway indicator overlies a conformal runway for assisting a pilot in completing an approach to landing on a runway. The dynamic runway indicator includes a polygon, e.g., a rectangle that, by changing position with respect to the conformal runway in response to movement of the aircraft, provides advanced instrumentation cues to the pilot for adjusting the aircraft flight path to a normal, or recommended, path to the runway for landing, thereby assisting the pilot to improve the accuracy and safety of the approach and landing.

One specific embodiment teaches a vision system for an aircraft, including a database capable of storing a position and dimensions of a target runway and a navigation system configured to determine a location of the aircraft. A display coupled to the database and the navigation system is configured to display a conformal runway representing the target runway and a runway indicator, the runway indicator including a landing zone on the target runway near the approach end; an outline on the approach end, departure end, first side, and second side of the runway; and a polygon having two sides with a distance therebetween greater than the runway width, wherein the navigation system is further capable of continually modifying the position of the polygon based on the position of the aircraft.

Referring to FIG. 1, a flight deck display system in accordance with the exemplary embodiments is depicted and will be described. The system 100 includes a user interface 102, a processor 104, one or more terrain databases 106 sometimes referred to as a Terrain Avoidance and Warning System (TAWS), one or more navigation databases 108, one or more runway databases 110, one or more obstacle databases 112 sometimes referred to as a Traffic and Collision Avoidance System (TCAS), various sensors 113, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

In the depicted embodiment, the processor 104 includes preferably an on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented.

The memory 103, 105 alternatively may be realized as flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display 116 might be realized using program code that is maintained in the memory 103, 105. The memory 103, 105 can be used to store data utilized to support the operation of the display 116, as will become apparent from the following description.

No matter how the processor 104 is specifically implemented, it is in operable communication with the terrain databases 106, the navigation databases 108, and the display device 116, and is coupled to receive various types of inertial data from the various sensors 113, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 113, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

A validated runway database 110 may store data related to, for example, runway lighting, identification numbers, position, and length, width, and hardness. As an aircraft approaches an airport, the processor 104 receives the aircraft's current position from, for example, the GPS receiver 122 and compares (verifies and monitors) the current position data with the distance and/or usage limitation data stored in the database for the landing system being used by that airport.

As the aircraft approaches the airport, the data in the validated runway database 110 is compared with other data determined by other devices such as the sensors 113. In other situations, the verified runway data such as position information may have been obtained previously by repeatedly collecting data during normal operations. These statistically verified data can be used to validate navigation data during flight or during navigation database compilation processes. If the data matches, a higher level of confidence is obtained.

The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a navigation computer. However, for ease of description and illustration, only an instrument landing system (ILS) receiver 118, an inertial navigation system 120 (INS), and a global position system (GPS) receiver 122 are depicted in FIG. 1.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

Although the aviation embodiments in this specification are described in terms of the currently widely used ILS, embodiments of the present invention are not limited to applications of airports utilizing ILS. To the contrary, embodiments of the present invention are applicable to any navigation system (of which ILS is an example) that transmits a signal to aircraft indicating an approach line to a runway. Alternate embodiments of the present invention to those described below may utilize whatever navigation system signals are available, for example a ground based navigational system, a GPS navigation aid, a flight management system, and an inertial navigation system, to dynamically calibrate and determine a precise course. For example, a WAAS enabled GPS unit can be used to generate deviation output relative to an approach vector to a runway and produce similar type of deviation signals as a ground based ILS source.

The INS 120 is a navigation aid that uses (not shown) a computer, motion sensors (accelerometers) and rotation sensors (gyroscopes) to continuously calculate via dead reckoning the position, orientation, and velocity (direction and speed of movement) of a moving object without the need for external references. The INS 120 is periodically provided with its position and velocity by the GPS receiver 122, in the preferred embodiment, and thereafter computes its own updated position and velocity by integrating information received from the motion sensors. The advantage of an INS 120 is that it requires no external references in order to determine its position, orientation, or velocity once it has been initialized. The INS 120 can detect a change in its geographic position (a move east or north, for example), a change in its velocity (speed and direction of movement), and a change in its orientation (rotation about an axis). It does this by measuring the linear and angular accelerations applied to the system.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display 116 is suitably designed to process data obtained from the sources of flight status data in the manner described in more detail herein.

Figure 2:
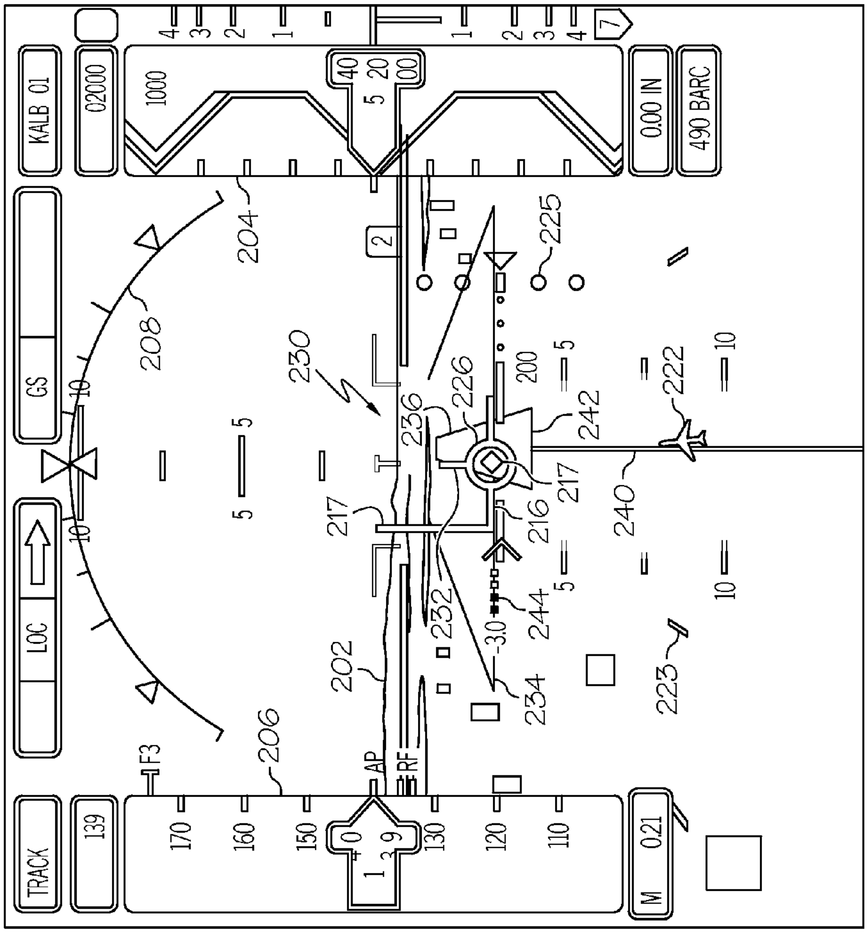
FIG. 2 is an exemplary image that may be rendered on the flight display system of FIG. 1.

Referring to FIG. 2, textual, graphical, and/or iconic information rendered by the display device 116, in response to appropriate display commands from the processor 104, is depicted. It is seen that the display device 116 renders a view of the terrain 202 ahead of the aircraft, preferably as a three-dimensional perspective view, an altitude indicator 204, an airspeed indicator 206, an attitude indicator 208, and a flight path vector indicator 216. Additional information (not shown) is typically provided in either graphic or numerical format representative, for example, of glide slope, altimeter setting, and navigation receiver frequencies.

An aircraft icon 222 represents the current heading direction relative to the specific runway 226 on which the aircraft is to land. The desired aircraft direction is determined, for example, by the processor 104 using data from the navigation database 108, the sensors 113, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the aircraft icon 222.

The flight path marker 216 is typically a circle with horizontal lines (representing wings) extending on both sides therefrom, a vertical line (representing a rudder) extending upwards therefrom, and indicates where the plane is "aimed". One known enhancement is, when the flight path marker 216 blocks the view of another symbol on the screen 116, the portion of the flight path marker 216 that is blocking the other symbol becomes transparent.

An acceleration cue 217 is a marker, sometimes called a "carrot", on or near one of the horizontal lines of the flight path marker 216. The marker 217 typically moves vertically upward when the plane accelerates (or the wind increases), or vertically downward, or becomes shorter, when the plane decelerates.

Perspective conformal lateral deviation symbology provides intuitive displays to flight crews of current position in relation to an intended flight path. In particular, lateral deviation symbology indicates to a flight crew the amount by which the aircraft has deviated to the left or right of an intended course. Lateral deviation marks 223 and vertical deviation marks 225 on perspective conformal deviation symbology represent a fixed ground distance from the intended flight path. As the aircraft ascends or descends, the display distance between the deviation marks 223, 225 will vary. However, the actual angular distance from the intended flight path represented by the deviation marks 223, 225 remains the same. Therefore, flight crews can determine position information with reduced workload by merely observing the position of the aircraft in relation to the deviation marks 223, 225. Regardless of attitude or altitude, flight crews know how far off course an aircraft is if the aircraft is a given number of deviation marks 223, 225 from the intended flight path.

The lateral deviation marks 223 are lateral deviation indicators used to provide additional visual cues for determining terrain and deviation line closure rate. The lateral deviation marks 223 are used to represent both present deviations from the centerline of the runway 226 and direction of aircraft movement. Thus, the lateral deviation marks 223 provide a visual guide for closure rate to the centerline allowing the pilot to more easily align the aircraft with the runway 226.

The processor 104 generates the lateral deviation marks 223 based on current aircraft parameters obtained from the navigation database 108 and/or other avionic systems. The lateral deviation marks 223 may be generated by computing terrain-tracing projection lines at a number of fixed angles matching an emission beam pattern of the runway ILS beacon. Sections of the terrain-tracing lines in the forward looking perspective display view may be used to generate the lateral deviation marks 223.

Terrain augmented conformal lateral and vertical deviation display symbology improves a pilot's spatial awareness during aircraft approach and landing. The pilot can quickly interpret the symbology and take actions based on the elevation of the surrounding terrain. As a result, aircraft navigation may be simplified, pilot error and fatigue may be reduced, and safety may be increased.

Figure 3:
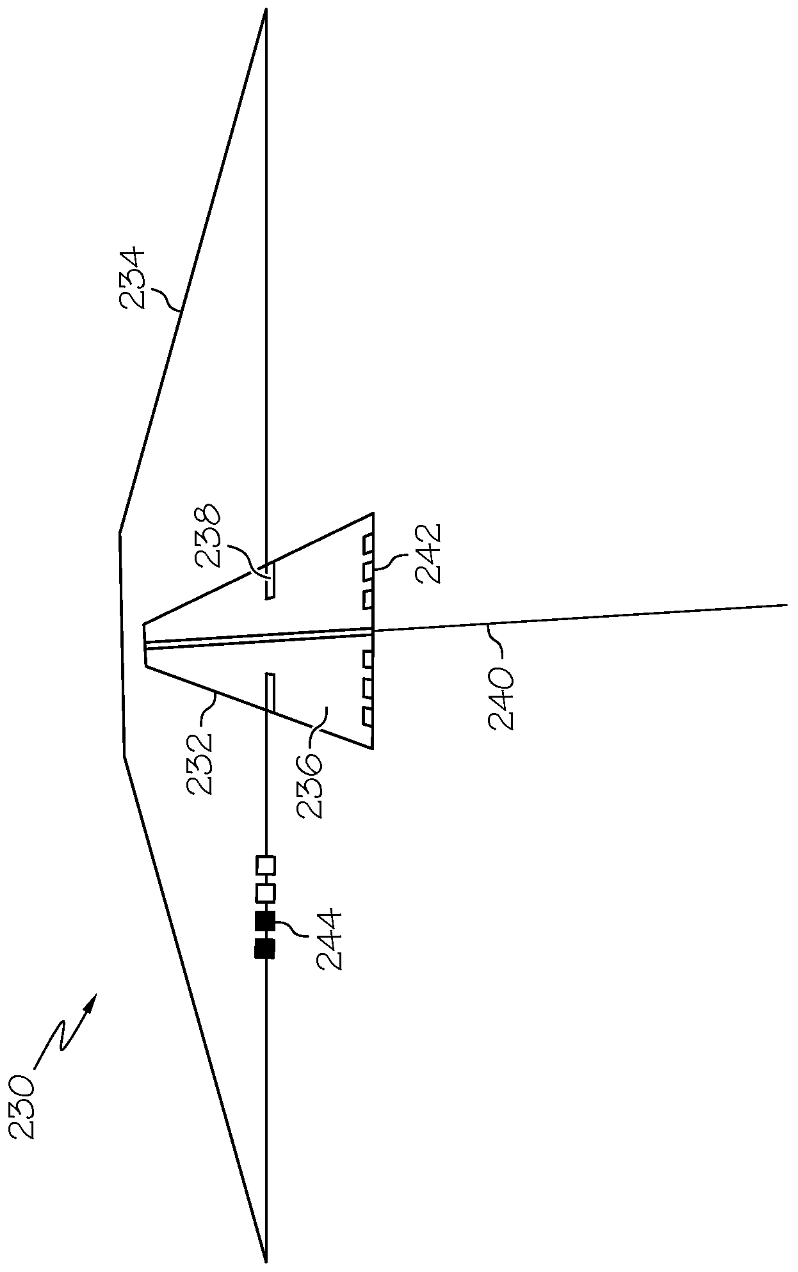
FIG. 3 is a partial exemplary image of that shown in FIG. 2.

In accordance with an exemplary embodiment, a runway position indicator 230 is provided that includes a runway outline 232, a dynamic runway symbol 234, a textured runway 236, a touchdown zone 238, an approach course 240, a runway threshold 242, and a virtual PAPI 244. These items are shown in FIG. 3 in addition to FIG. 2 for illustration.

Runway Outline

The cyan colored runway outline 232 around the edges of the runway provides delineation of runway of intended landing along with motion and location cues to the pilot when the range to the runway is not too long. The position, length, and width of the runway are stored in the runway database 110 for a plurality of runways. When a desired runway is selected (on which a landing is to be made), the size of the runway outline 232 is calculated.

Dynamic Runway Symbol

The super-sized cyan colored intended runway symbol 234 is visible on the display screen at large distances from the runway. It emanates from the Touchdown Zone and provides cues as to where the runway is, perspective cues to the runway and the location of the touchdown zone. The dynamic sizing of the runway symbol 234 provides motion cues in all dimensions, i.e. up/down, left/right and forward motion flow including sense of ground closure. The size of the dynamic runway symbol 234 is determined by software based on the runway size, the altitude, and attitude of the aircraft distance to the approaching runway. The symbol size change may not be linearly related to the distance to the runway. Generally, the size of the dynamic runway symbol 234 is about up to twice the runway length and about up to six times the width of the runway when close by.

For example, when runway is more than 20 miles away, the symbol box may be twice the length but more than 10 times the width of the runway in order to facilitate the visual identification of the intended landing area on the display due to perspective view size reduction at distance. As the aircraft flies closer to the runway, for example, at 4 miles, the symbol box may become six times of the runway width.

One way to calculate the symbol width can be done as Width=dw*f where dw is the database runway width and f is the size adjusting factor. For example, the term f is equal to 10 if distance to runway is larger than 20 NM. The term f can be reduced linearly from 10 to 6 when distance to the approaching runway is reduced from 20 to 4 NM, and f=6 if runway is less than 4 NM away.

Textured Runway

The runway 236 is textured, for example, in gray with cyan runway number and muted white centerline provides motion and location cues when range to the runway is extremely short.

Touchdown Zone

The cyan colored touchdown zone 238 is calculated from the runway database 110 values gathered from the Aeronautical Information Publication and is visible on the display screen at large distances from the runway. It is the "point of reference" of the flight director (FD). The flight director is providing commands to "fly" the flight-path vector symbol to the touchdown zone. Also, the pilot can fly "flight path reference line" (not shown) over touchdown zone symbology to ensure that the aircraft is on the proper glide path. The touch down zone symbols include the rendered marking area on the runway and the leading edge of the dynamic runway symbol box centered at the touch down zone.

Approach Course

The cyan approach course symbol 240 extends, preferably, about 32 kilometers, from the runway and is visible at large distances from the runway. It provides alignment cues to the approach course.

Virtual PAPI

The shades of red to white virtual precision approach path indicator (PAPI) 244 symbol is derived from approach aircraft position data and runway database values. It provides intuitive vertical glide path cues to the pilot. The virtual PAPI indicates the calculated deviation from the published glide slope angle to the touch down point. It is an independent indication from a typical ground based glide slope source. As an example, the current aircraft altitude and position measurement relative to the touch down zone can be used to generate a glide slope, independent of the primary guidance. When the generated slope matches that of published value, the virtual PAPI is shown as two red and two white. As such, if this display is very different from primary guidance displayed glide slope, cockpit cross check would be indicated or initiated.

The system and method disclosed herein provides the pilot with supplementary guidance by supporting the pilot's ability to fly a stabilized approach, verifying the aircraft is continuously in a position to complete a normal landing using normal maneuvering, and facilitates a guided search for the landing runway aiding the pilot in the visual acquisition of the landing runway environment, and below decision height or minimum descent altitude, supports the pilot's ability to continue normal flight path to the intended runway. The runway position indicator 230 and the flight director 428 enables the use of the dynamic runway symbol 234 as an air point in addition to the traditional decision point in space. The runway position indicator 230 provides a means to verify the primary guidance information for standard approach guidance, and utilizes a separate process to produce and display the runway guidance symbol 240. The runway position indicator 230 is positioned with high precision instruments including the inertial navigation system 120 and the global positioning system 122.

In the "instrument segment" of an approach procedure the runway position indicator 230 provides supplementary guidance to support the pilot's ability to fly a stabilized approach. The runway position indicator 230 provides cues that facilitate the pilot's understanding and improve performance when manually flying "raw data," when flying a Flight-Path Director (FPD, computer 428 of FIG. 4), or when coupled to the autopilot on approach. Flight-Path Director commands (climb, descend, turn left or right) are given bigger context when presented in a conformal way with-respect-to the runway depiction. The FPD command (i.e., the FPD symbol 217) is seen relative to the runway analog and the Flight Path Vector Symbol 216 which provides a sense of magnitude and direction to a given FPD command.

In the "instrument segment" of an approach procedure, the runway position indicator 230 provides cues to verify that the aircraft is continuously in a position to complete a normal landing using normal maneuvering. The runway position indicator 230 is used to confirm the aircraft's position with respect to the intended landing runway. The runway position indicator 230 is a natural analog of the real world and easy to interpret, whereas the pilot is utilizing the same skills as when flying visually.

During the "instrument segment" of an approach procedure, prior to the DA(H) or MDA, the runway position indicator 230 facilitates a "guided search" for the landing runway, aiding the pilot in the visual acquisition of landing runway environment as the pilot gains natural vision of the outside world. Expected crew action is to use the runway position indicator 230 and associated symbology as an aid in visually acquiring the intended landing runway. The symbology produces a cognitive perception or "visual-flow" toward the landing runway. The visual analog of the "runway environment" is a comprehensive picture of the landing surface, including: runway markings, all airport runways (including runways not intended for landing), touchdown zone location, indications of lateral cross track, "drift-angle," vertical descent guidance and distance to the touchdown zone. The "intended landing runway" is graphically differentiated from other airfield runways.

Below DH(A), the runway position indicator 230 supports the pilot's ability to continue normal path to intended runway of landing. In the "visual segment" of an instrument approach procedure, the runway position indicator 230 presents cues that augment and aid the pilot in the visual maneuver to the landing runway. In low visibility conditions, the transition between instrument flight and visual flight is especially challenging. During the transition to visual flight, it is common practice for the pilot to divide cognitive attention between the outside view and the instruments to insure a stabilized path is maintained. The runway position indicator 230 is a real world analog and included symbology elements that are easy interpret. This reduces the time required to read the flight instruments and smooth the progress of the pilot's transition to landing.

Figure 4:
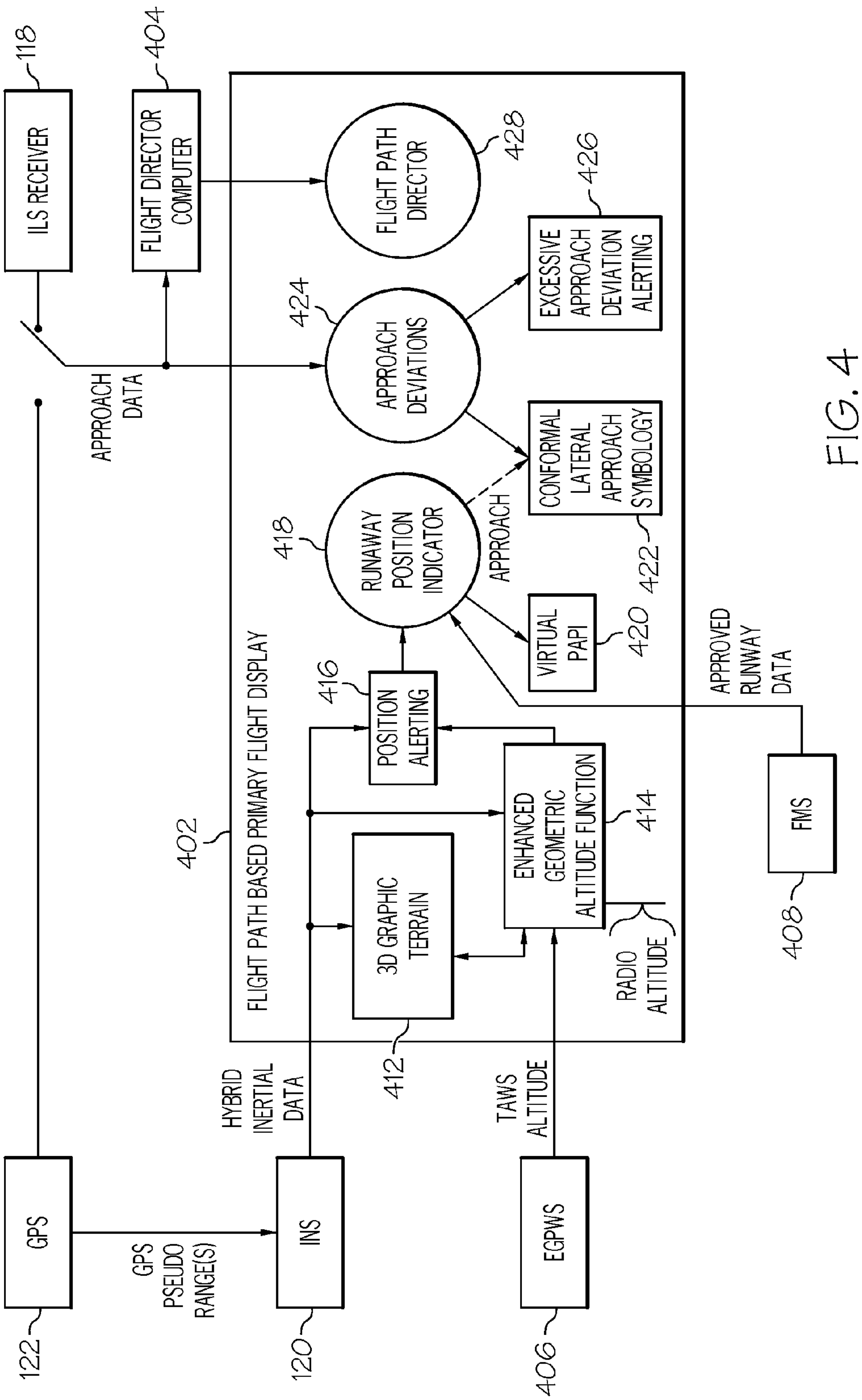
FIG. 4 is a functional block diagram of a display included in FIG. 1.

Referring to the block diagram of FIG. 4, a display system 402, which includes the display 116, is coupled to the inertial navigation system 120, the GPS system 122 the ILS receiver 118, a flight director computer 404, a terrain awareness and warning system 406, and a flight management system 408 which includes the terrain database 106. While the ILS receiver 118 is the primary provider of approach information, the GPS receiver 122 serves as backup and confirmation of the ILS data. If the ILS receiver 118 is temporally lost, the GPS information may be used to complete the approach. Furthermore, the GPS information is supplied to the inertial navigation system 120, and if the GPS data is temporally lost, the inertial navigation system 120 may be used to complete the approach.

The display system 402 includes a three dimensional graphic terrain function 412 including a visualization terrain and obstacle databases (not shown), an enhanced geometric altitude function 414, a position alerting function 416, a runway position indicator 230 function 418, a virtual PAPI function 420, a conformal lateral approach symbology function 422, an approach deviations function 424, an excessive approach deviation alerting function 426, and a flight path director 428.

The ILS receiver 118 glide slope information is provided to the flight director computer 404, which in turn, provides the information to the flight path director 428. The glide slop information is also provided to the display system 402 to determine approach deviations 426. The approach deviations are used to display conformal lateral approach symbology 422 such as the lateral deviations marks 223 and to provide an alert message (excessive approach deviation alerting function) 426 if excessive approach deviations are determined. If a signal from the ILS receiver 118 is temporarily unavailable, the approach deviations may be determined from information provided by the GPS 122.

The GPS 122 provides position and altitude data to the INS 120, which in turn, provides hybrid inertial data for providing data to the graphic terrain 412, the enhanced geometric altitude function 414, and for position alerting 416 (for example, with regards to position accuracy and integrity of the runway position indicator 230, and with respect to the primary guidance and the runway position indicator 230). Data (TAWS altitude) from the emergency ground proximity warning system 406 is provided to the enhanced geometric altitude function 414. The INS 120 combines GPS 122 position data which is updated less frequently with inertial sensor data to provide continuous position information. When the GPS 122 is temporarily unavailable, the INS 120 can still predict in short term the aircraft position change using the integrated inertial data. When these position changes are added to the position determined at the time of GPS 122 availability, the short term absolute position (latitude, longitude, and altitude) of an aircraft can be accurately determined. In addition, INS 120 data can be used to monitor certain GPS 122 data anomalies such as sudden data jump due to interferences as this type short term behavior is not present in the integrated inertial sensor data, allowing the system to reject these types of faulty inputs.

Figure 5A:
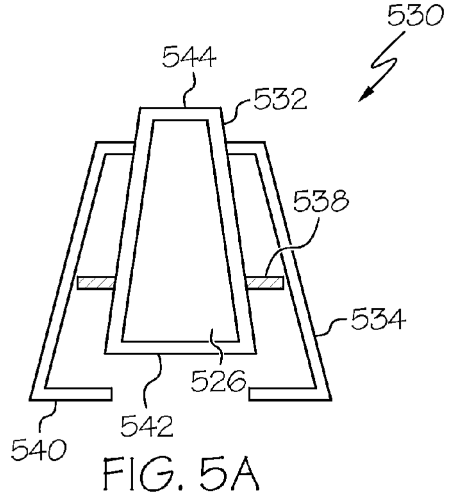
FIGS. 5A-5E are exemplary images in accordance with a first exemplary embodiment.
Figure 5B:
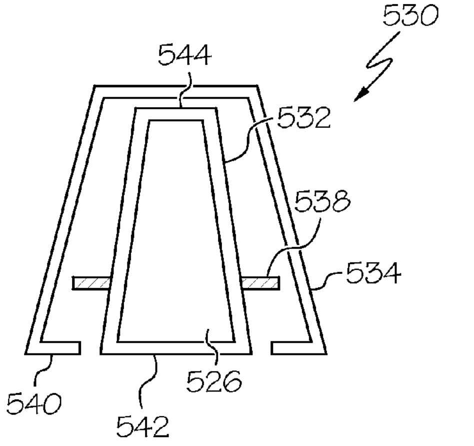
Figure 5C:
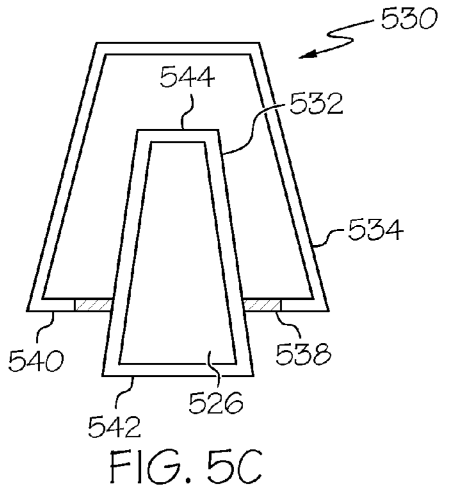
Figure 5D:
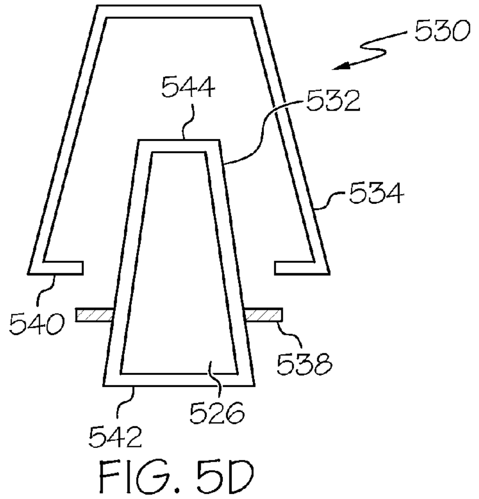
Figure 5E:
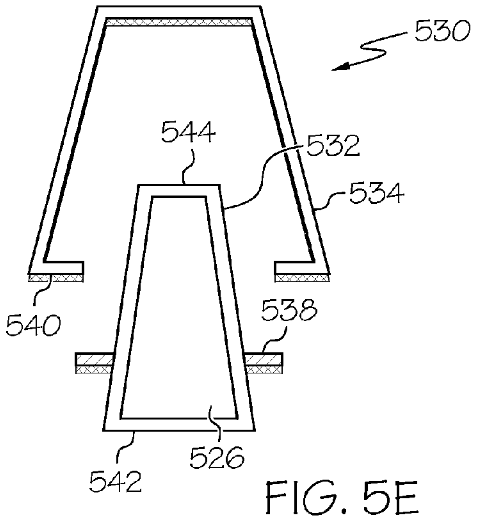

Referring to FIG. 5A-E, a first exemplary embodiment is a runway approach indicator 530 including a runway outline 532, a dynamic runway symbol 534, and a touchdown zone 538 all positioned with respect to the conformal runway 526. FIG. 5C is the position of the dynamic runway approach indicator 530 when the aircraft is in proper position, e.g., aligned with the runway centerline and at the recommended altitude (on the glide slope) at the current distance to the runway, for completion of a safe landing. The runway 526 and runway outline 532 illustrates the desired landing target for the pilot. The dynamic runway symbol 534 emphasizes the position of the aircraft so the pilot may correct the aircrafts position relative to the runway. Note that the touchdown zone 538 does not change for each of the FIGS. 5A-5E. FIG. 5B shows the dynamic runway symbol 534 closer to the pilots viewpoint than that of FIG. 5C, indicating the current approach by the aircraft is at a lower altitude than recommended (below the recommended glide slope). To illustrate that the dynamic runway symbol 534 is closer to the pilot's viewpoint, the end 540 is displayed at about the runway threshold 542. When the aircraft is even lower, the dynamic runway symbol 534 is even closer to the pilot's viewpoint (FIG. 5A), by having the end 540 being displayed below, or off, the runway threshold 542. FIG. 5D shows the dynamic runway symbol 534 further from the pilots viewpoint than that of FIG. 5C indicating the current approach by the aircraft is at a higher altitude than recommended (above the recommended glide slope). To illustrate that the dynamic runway symbol 534 is further from the pilot's viewpoint, the end 540 is displayed part way along the runway past the touchdown zone 538. When the aircraft is even higher, the dynamic runway symbol 534 is even further from the pilot's viewpoint, by having the end 540 being displayed closer to the departure end 544 of the runway 526 ( ) FIG. 5E. To further emphasis the positioning of the dynamic runway symbol 534, shadowing of the runway 526 (FIG. 5A) and the dynamic runway symbol 534 (FIG. 5E) may be used.

Figure 6A:
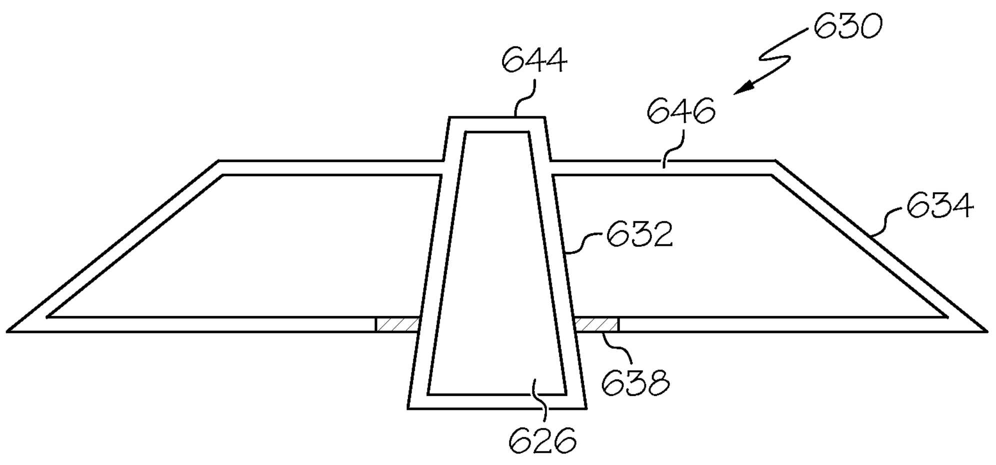
FIGS. 6A-6E are exemplary images in accordance with a second exemplary embodiment.
Figure 6B:
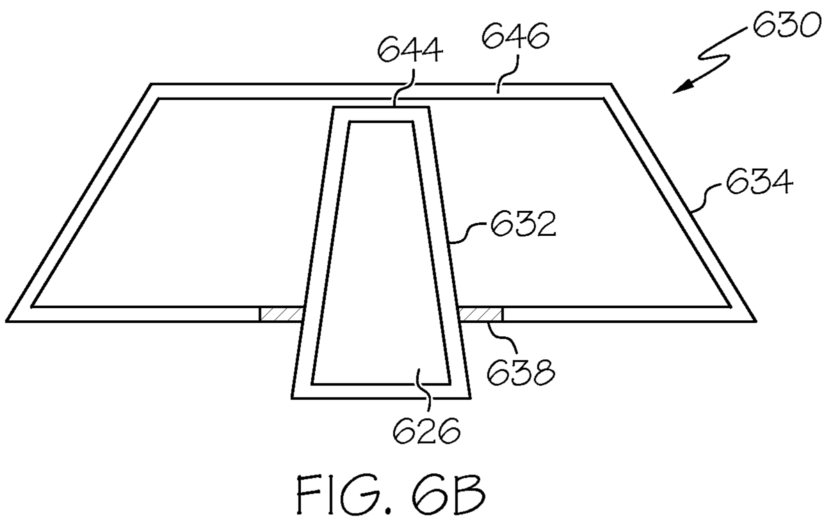
Figure 6C:
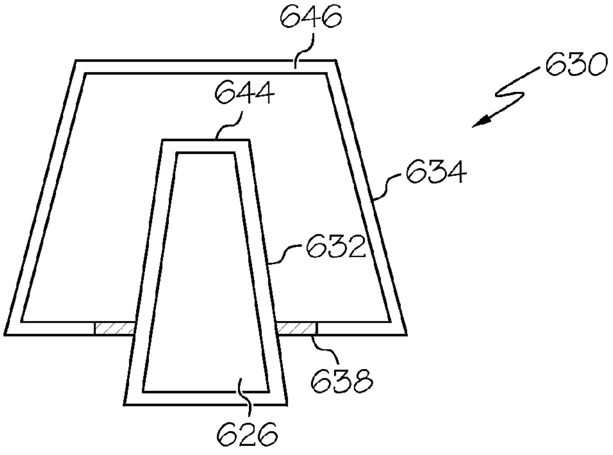
Figure 6D:
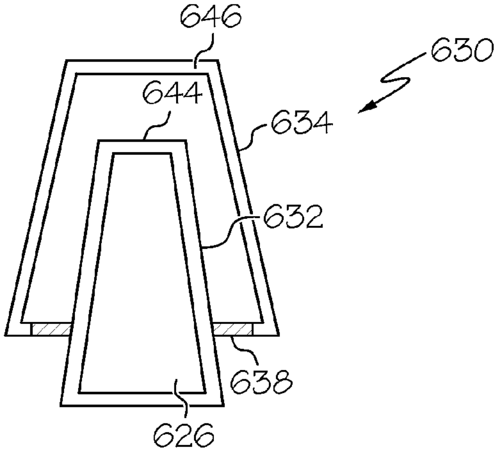
Figure 6E:
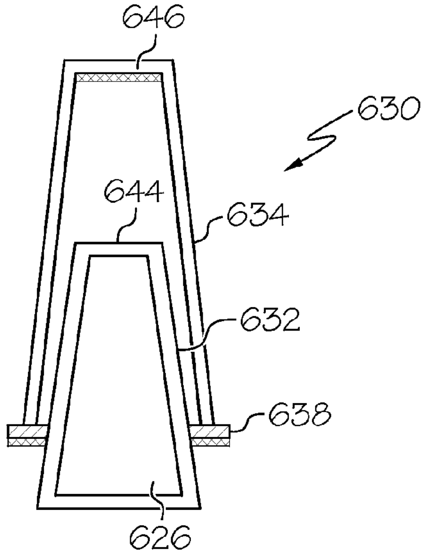

Referring to FIG. 6A-E, a second exemplary embodiment is a dynamic runway approach indicator 630 including a runway outline 632, a dynamic runway symbol 634, and a touchdown zone 638 all positioned with respect to the conformal runway 626. FIG. 6C is the position of the dynamic runway approach indicator 630 when the aircraft is in proper position, e.g., aligned with the runway centerline and at the recommended altitude (on the glide slope) at the current distance to the runway, for completion of a safe landing. Note that the touchdown zone 638 does not change for each of the FIGS. 6A-6E. FIG. 6B shows the dynamic runway symbol 634 wider, or further from the sides of the runway 636, from the pilots viewpoint, than that of FIG. 6C, indicating the current approach by the aircraft is at a lower altitude than recommended (below the recommended glide slope). To further illustrate that the aircraft is low, a far end 646 of the dynamic runway symbol 634 is displayed at about the runway departure end 644. When the aircraft is even lower (FIG. 6A), the dynamic runway symbol 634 is even wider from the pilot's viewpoint, and the symbol end 640 is displayed short of the runway departure end 644. FIG. 6D shows the dynamic runway symbol 634 narrower, or closer to the sides of the runway 626 from the pilots viewpoint, than that of FIG. 6C, indicating the current approach by the aircraft is at a higher altitude than recommended (above the recommended glide slope). To further illustrate that the aircraft is high, the dynamic runway symbol end 646 is displayed further past the departure end 644. When the aircraft is even higher (FIG. 6E), the dynamic runway symbol 634 is even narrower from the pilot's viewpoint, by having the end 646 being displayed further from the departure end 644 of the runway 626. To further emphasize the positioning of the dynamic runway symbol 634, shadowing of the runway 626 (FIG. 6A) and the dynamic runway symbol 634 (FIG. 6E) may be used. In summary, the emphasis provided by the graphical change of the polygon around the runway aids the pilot in determining a flight path angle to the runway.

Figure 7A:
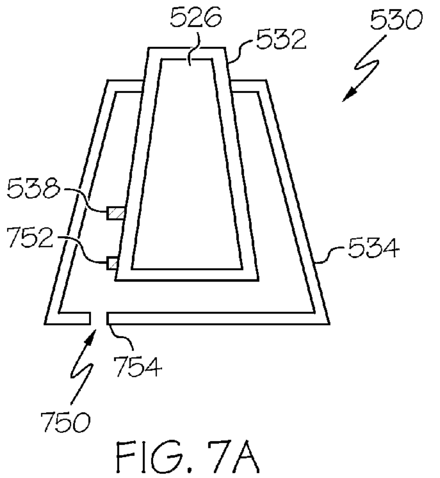
FIGS. 7A-7E are exemplary images in accordance with a third exemplary embodiment.
Figure 7B:
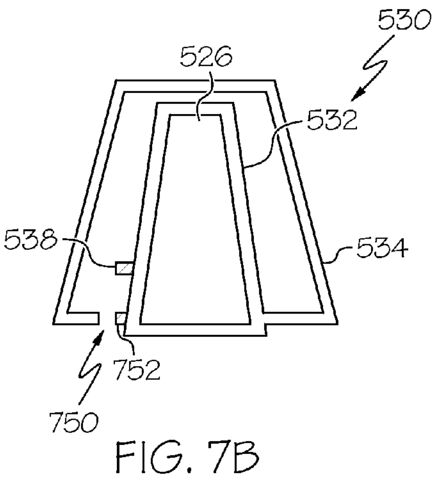
Figure 7C:
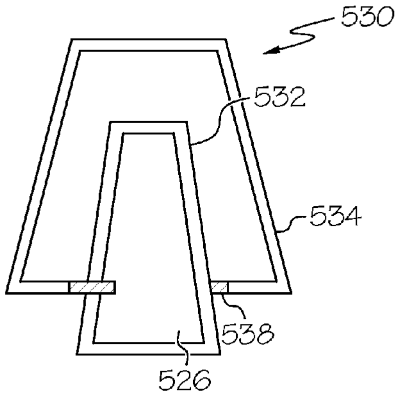
Figure 7D:
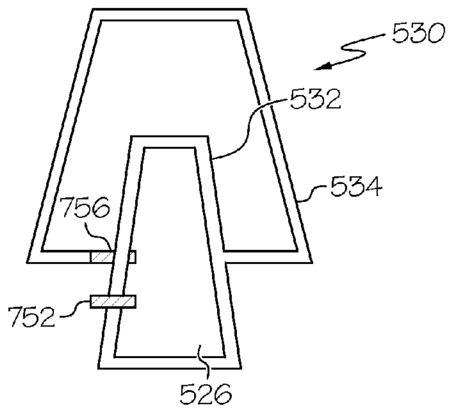
Figure 7E:
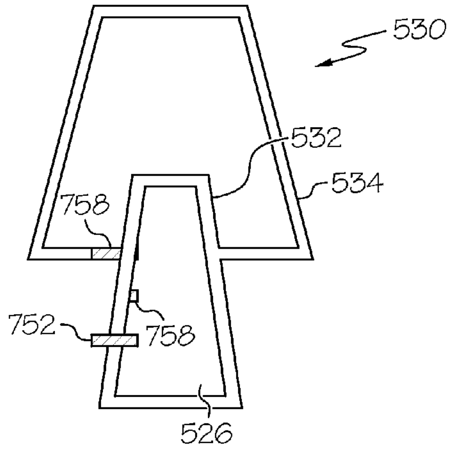

Referring to FIG. 7A-E, a third exemplary embodiment, similar to the first exemplary embodiment of FIGS. 5A-5E is a dynamic runway approach indicator 530 including a runway outline 532, a dynamic runway symbol 534, and a touchdown zone 538 all positioned with respect to the conformal runway 526. Elements similar to those elements shown in FIGS. 5A-5E bear the same reference numerals. Additionally, one or more deviation bars 750 may be displayed. FIG. 7C is the position of the dynamic runway approach indicator 530 when the aircraft is in proper position, e.g., aligned with the runway centerline and at the recommended altitude (on the glide slope) at the current distance to the runway, for completion of a safe landing. Note that the touchdown zone 538 does not change for each of the FIGS. 7A-7E. When the dynamic runway symbol 534 is in the position shown in FIG. 5C, the end 540 of the dynamic runway symbol 534 is aligned with the touchdown zone 538. When the aircraft is low on the approach (FIG. 7B), a first deviation bar 752 is displayed. When the aircraft is even lower (FIG. 7A), a second deviation bar 754 is displayed. When the aircraft is high (FIG. 7D), and even higher (FIG. 7E), deviation bars 756 and 758 are displayed, respectively. While the deviation bars 750 are aligned with the end 542 of the dynamic runway symbol 534 in FIGS. 7A-7B and 7D-7E, that need not be the case. The deviation bars 750 are preferably at fixed position from one another, while the end 540 of the dynamic runway symbol 534 will move in an analog fashion depending on the height of the aircraft.

Figure 8:
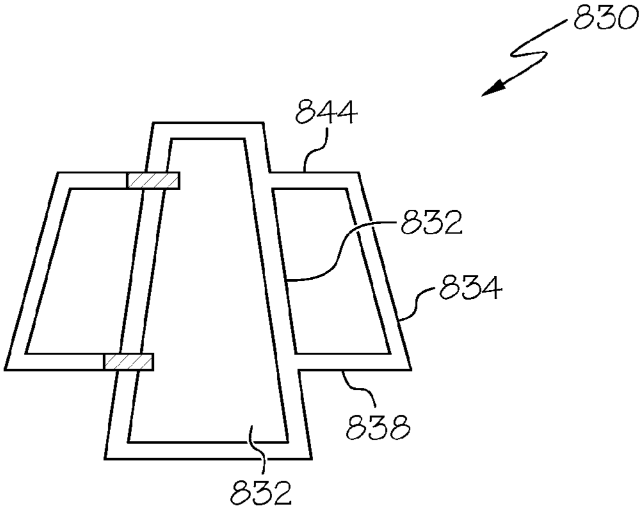
FIG. 8 is an exemplary image in accordance with a fourth exemplary embodiment.

A fourth exemplary embodiment shown in FIG. 8 is a dynamic runway approach indicator 830 including a runway outline 832, a dynamic runway symbol 834, and a touchdown zone 838 all positioned with respect to the conformal runway 832. FIG. 8 is the position of the dynamic runway approach indicator 830 when the aircraft is in proper position, e.g., aligned with the runway centerline and at the recommended altitude (on the glide slope) at the current distance to the runway, for completion of a safe landing. The dynamic runway symbol 830 may move depending on the height of the aircraft as described in the first three exemplary embodiments. In this fourth exemplary embodiment, the end 844 of the dynamic runway symbol 834 indicates the computed rollout of the aircraft on landing when touchdown is made at the touchdown zone 838. The computed rollout is calculated in a known method in response to aircraft speed at touchdown, aircraft type, and aircraft weight, for example.

Figure 9:
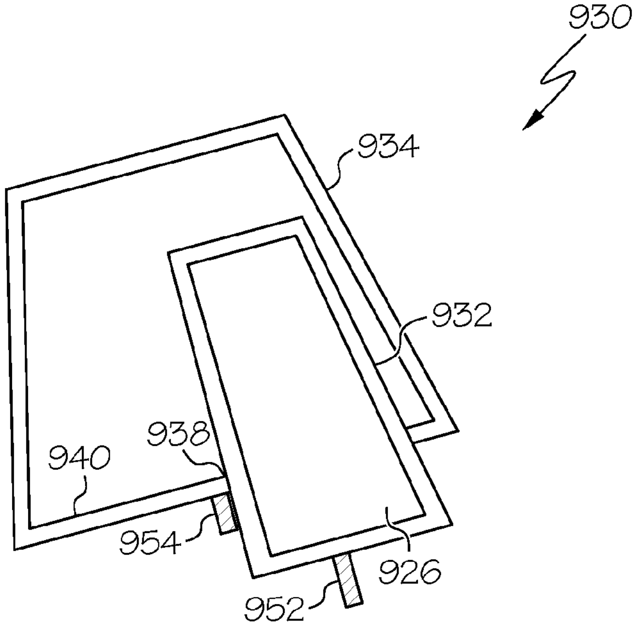
FIG. 9 is an exemplary image in accordance with a fifth exemplary embodiment.

A fifth exemplary embodiment shown in FIG. 9 is a dynamic runway approach indicator 930 including a runway outline 932, a dynamic runway symbol 934, and a touchdown zone 938 all positioned with respect to the conformal runway 932. FIG. 9 is the position of the dynamic runway approach indicator 930 when the aircraft is left of the runway centerline and at the recommended altitude at the current distance to the runway. The dynamic runway symbol 934 will move depending on the lateral spacing of the aircraft (not aligned with the runway centerline). In this fourth exemplary embodiment, one or more deviation bars 950 may be displayed. A deviation bar 952 shows the runway centerline, while the deviation bar 954 is centered on the end 940 of the dynamic runway symbol 934 and to the left of the deviation bar 952. The polygon 934 may also be positioned at a different angle relative to the runway outline 932 to emphasize the degree of angular difference between the landing runway's track and the aircraft's track.

Optional deviation bars 954 may be displayed with this fifth exemplary embodiment, providing a marker for judging how far the aircraft is to the runway. The deviation bars 750 are preferably at fixed position from one another, while the dynamic runway symbol 934 will move in an analog fashion depending on the distance the aircraft is to the side of the runway centerline.

Figure 10:
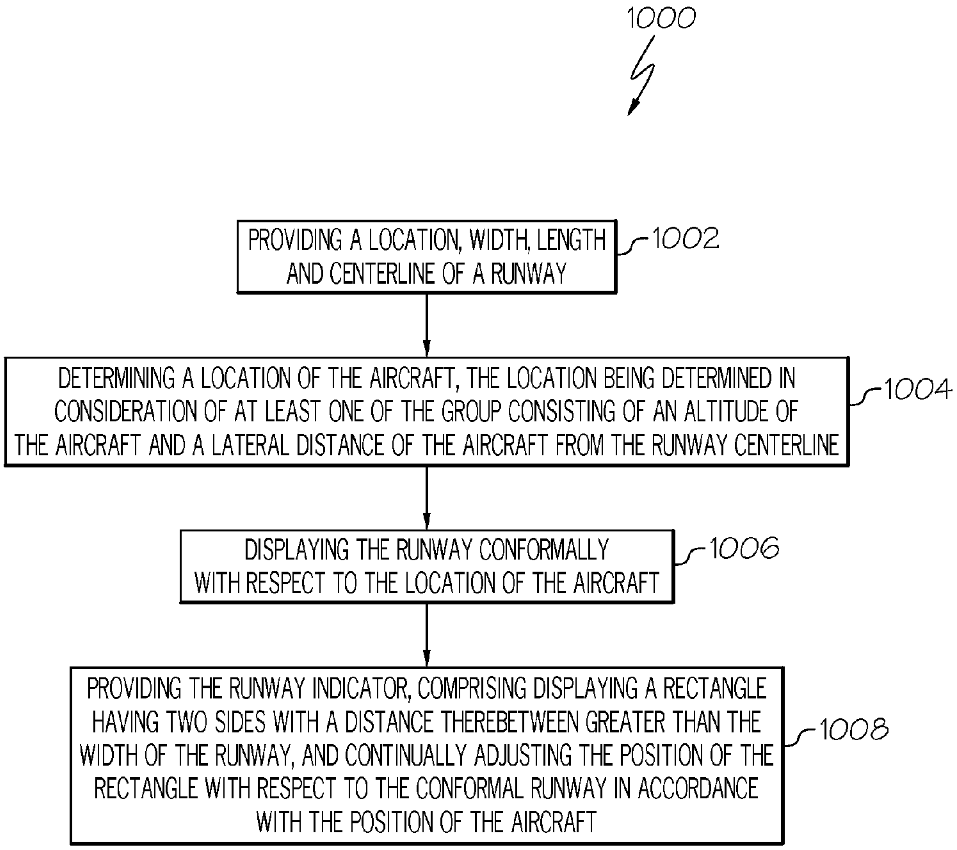
FIG. 10 is a flow chart of an exemplary method.

FIG. 10 is a flow chart that illustrates an exemplary embodiment of a display process 1000 suitable for use with a display system 100. Process 1000 represents one implementation of a method for displaying aircraft approach information on an onboard display of an aircraft. The various tasks performed in connection with process 1000 may be performed by software, hardware, firmware, or any combination thereof. For illustrative purposes, the following description of process 1000 may refer to elements mentioned above in connection with the preceding FIGS. In practice, portions of process 1000 may be performed by different elements of the described system, e.g., a processor, a display element, or a data communication component. It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein. Moreover, one or more of the tasks shown in FIG. 10 could be omitted from an embodiment of the process 1000 as long as the intended overall functionality remains intact.

The method 1000 of providing a runway indicator for assisting a pilot of an aircraft to complete an approach for landing on a recommended approach path, includes providing 1002 a location, width, length, and centerline of a runway; determining 1004 a position of the aircraft, the position being determined in consideration of at least one of the group consisting of an altitude of the aircraft and a lateral distance of the aircraft from the runway centerline; displaying 1006 the runway conformally with respect to the position of the aircraft; providing the runway indicator, comprising displaying a polygon having two sides with a distance therebetween greater than the width of the runway; and continually adjusting 1008 the position of the polygon with respect to the conformal runway in accordance with the position of the aircraft.

Figure 11A:
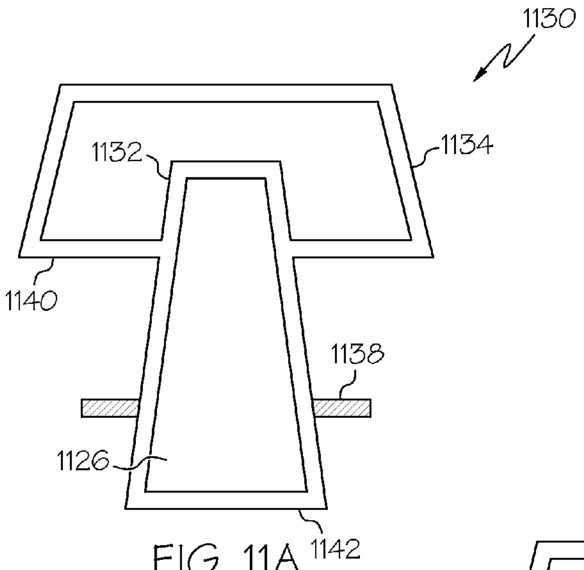
FIGS. 11A-11E are exemplary images in accordance with a sixth exemplary embodiment.
Figure 11B:
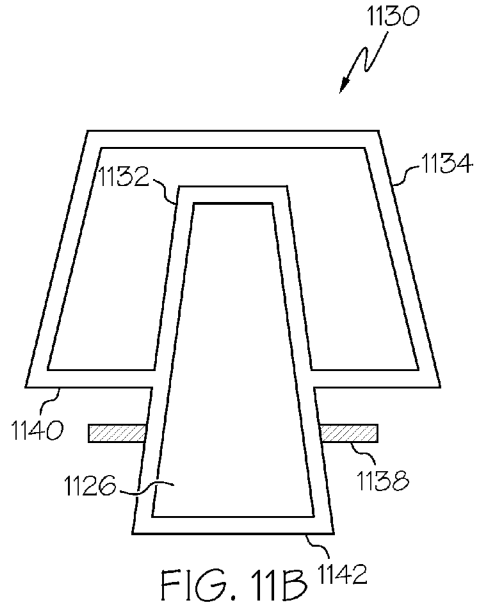
Figure 11C:
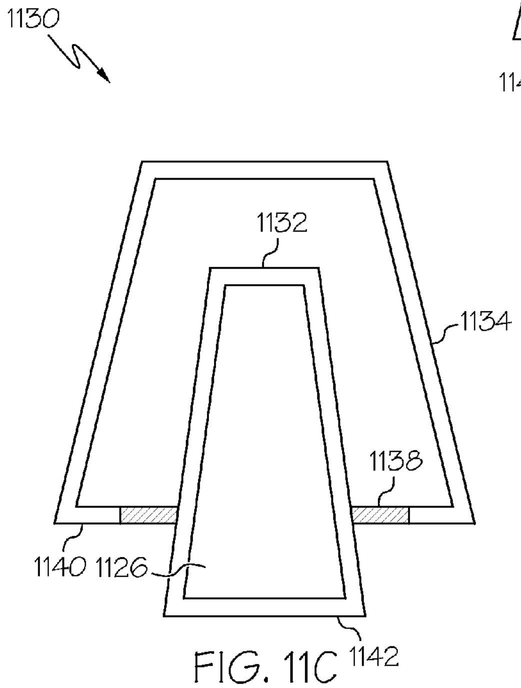
Figure 11D:
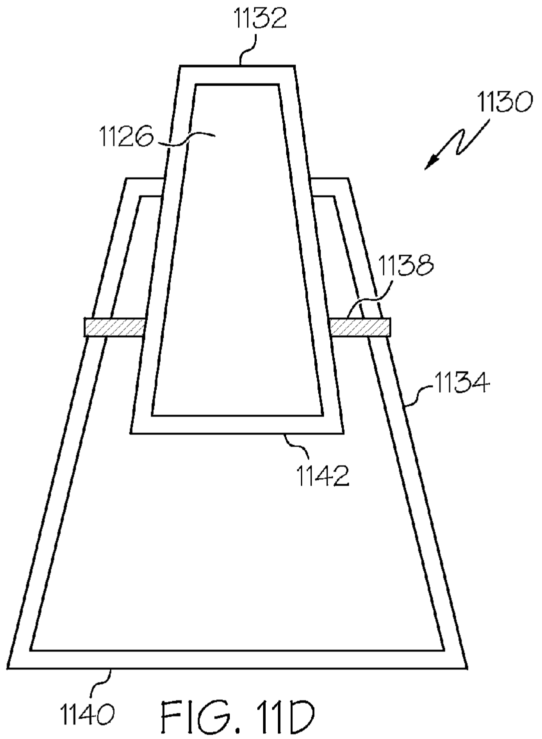
Figure 11E:
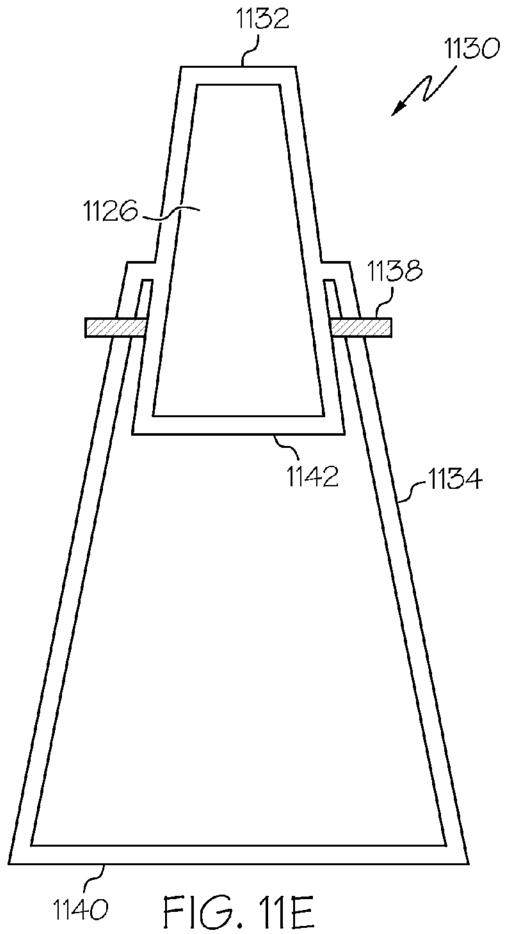

Referring to FIG. 11A-E, a sixth exemplary embodiment is a runway approach indicator 1130 including a runway outline 1132, a dynamic runway symbol 1134, and a touchdown zone 1138 all positioned with respect to the conformal runway 1126. FIG. 11C is the position of the dynamic runway approach indicator 1130 when the aircraft is in proper position, e.g., aligned with the runway centerline and at the recommended altitude (on the glide slope) at the current distance to the runway, for completion of a safe landing. The runway 1126 and runway outline 1132 illustrates the desired landing target for the pilot. The dynamic runway symbol 1134 emphasizes the position of the aircraft so the pilot may correct the aircrafts position relative to the runway. Note that the touchdown zone 1138 does not change for each of the FIGS. 11A-11E. FIG. 11B shows the dynamic runway symbol 1134 higher to the pilots viewpoint than that of FIG. 11C, indicating the current approach by the aircraft is at a lower altitude than recommended (below the recommended glide slope). To illustrate that the dynamic runway symbol 1134 is higher to the pilot's viewpoint, the end 1140 is displayed beyond and above the runway threshold 1142. When the aircraft is even lower, the dynamic runway symbol 1134 is even higher to the pilot's viewpoint (FIG. 11A), by having the end 1140 being displayed above, or almost off, the runway departure end. FIG. 11D shows the dynamic runway symbol 1134 lower from the pilots viewpoint than that of FIG. 11C indicating the current approach by the aircraft is at a higher altitude than recommended (above the recommended glide slope). To illustrate that the dynamic runway symbol 1134 is lower from the pilot's viewpoint, the end 1140 is displayed before, or below, the runway 1126. When the aircraft is even lower, the dynamic runway symbol 1134 is even further below the pilot's viewpoint, by having the end 1140 being displayed even further before the runway 1126 (FIG. 11E). An advantage of this sixth exemplary embodiment is that the pilot may place the flight path marker 216 over the end 1140 of the dynamic runway symbol 1134 (regardless of whether the aircraft is high or low), thereby causing the aircraft to fly towards the proper altitude/distance (glide slope) as understood by those skilled in the art until the picture of FIG. 11C becomes illustrated. The pilot may continue with the flight path marker 216 on the end 1140 to maintain the proper glide slope.

Figure 12A:
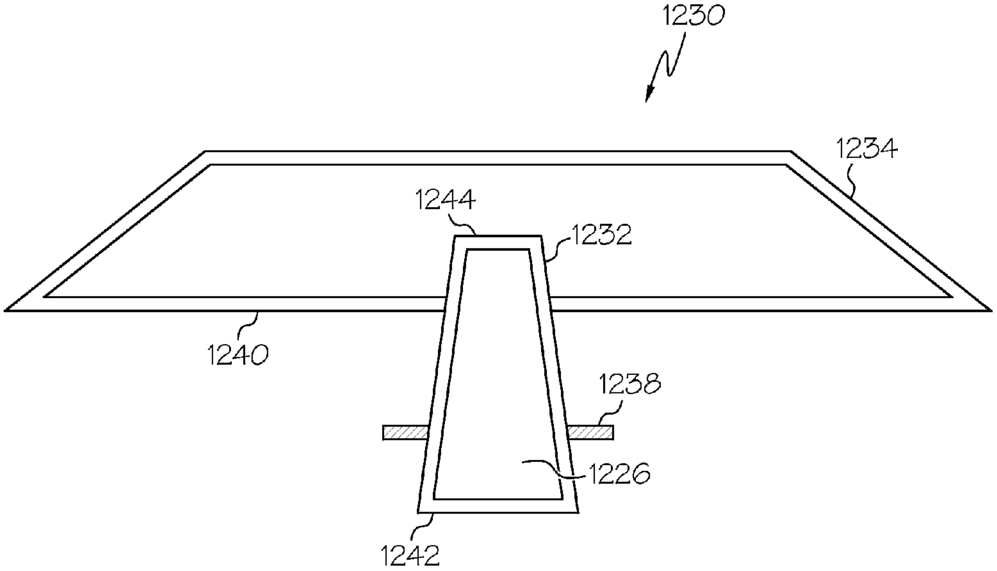
FIGS. 12A-12E are exemplary images in accordance with a seventh exemplary embodiment
Figure 12B:
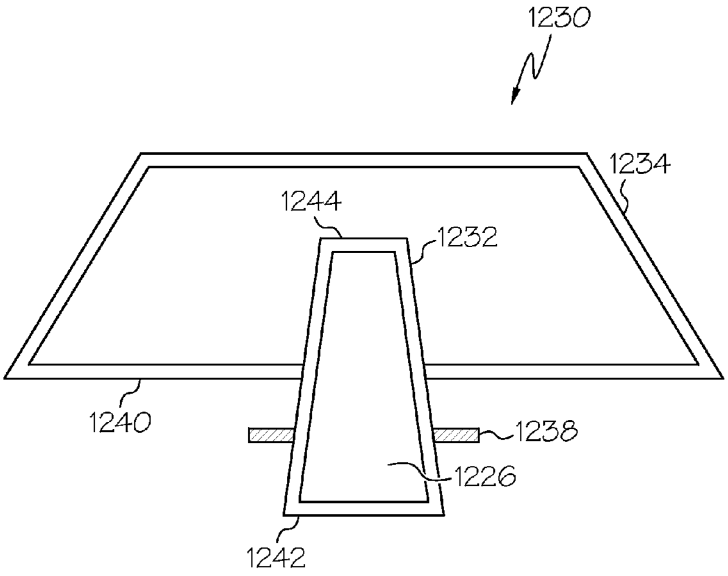
Figure 12C:
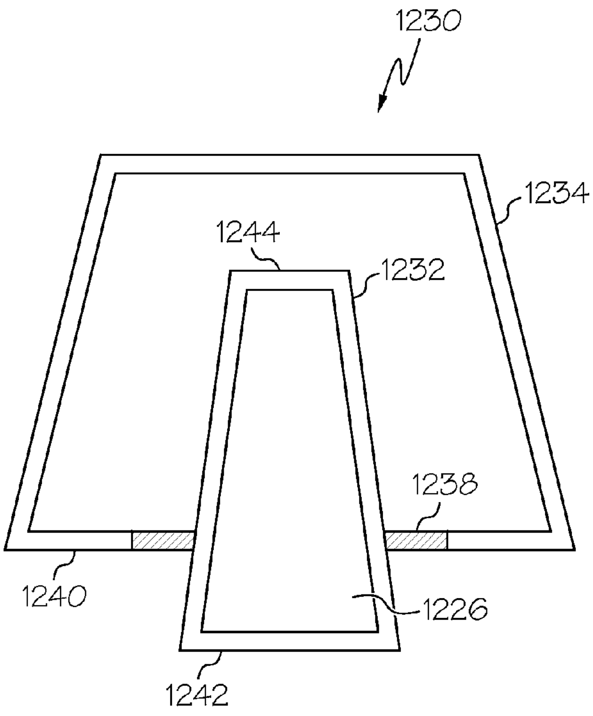
Figure 12D:
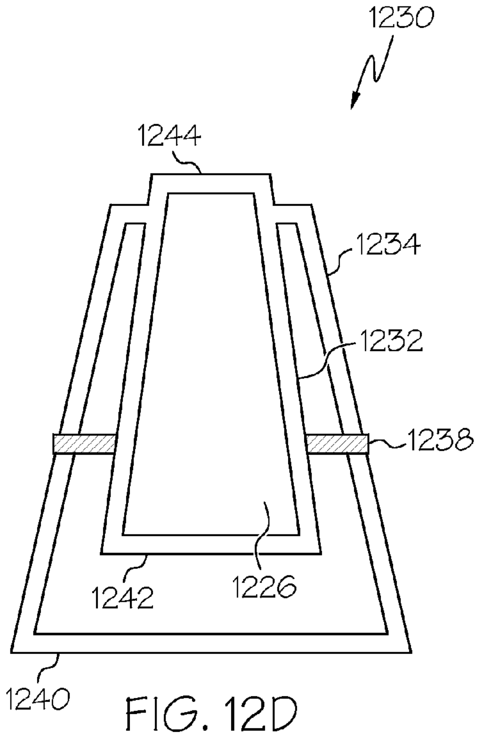
Figure 12E:
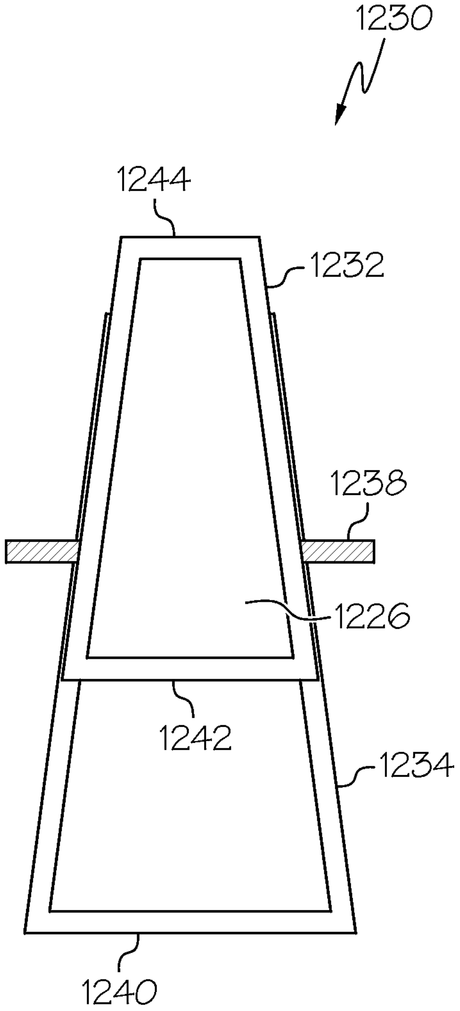

Referring to FIG. 12A-E, a seventh exemplary embodiment is a dynamic runway approach indicator 1230 including a runway outline 1232, a dynamic runway symbol 1234, and a touchdown zone 1238 all positioned with respect to the conformal runway 1226. FIG. 12C is the position of the dynamic runway approach indicator 1230 when the aircraft is in proper position, e.g., aligned with the runway centerline and at the recommended altitude (on the glide slope) at the current distance to the runway, for completion of a safe landing. Note that the touchdown zone 1238 does not change for each of the FIGS. 12A-12E. FIG. 12B shows the dynamic runway symbol 1234 wider and higher from the sides of the runway 1236, from the pilots viewpoint, than that of FIG. 12C, indicating the current approach by the aircraft is at a lower altitude than recommended (below the recommended glide slope). When the aircraft is even lower (FIG. 12A), the dynamic runway symbol 1234 is even wider and higher from the pilot's viewpoint, and the symbol end 1240 is displayed further along the runway towards the runway departure end 1244. FIG. 12D shows the dynamic runway symbol 1234 narrower and lower to the sides of the runway 1226 from the pilots viewpoint, than that of FIG. 12C, indicating the current approach by the aircraft is at a higher altitude than recommended (above the recommended glide slope). When the aircraft is even higher (FIG. 12E), the dynamic runway symbol 1234 is even narrower and lower from the pilot's viewpoint. An advantage of this seventh exemplary embodiment is that the pilot may place the flight path marker 216 over the end 1140 of the dynamic runway symbol 1134 (regardless of whether the aircraft is high or low), thereby causing the aircraft to fly towards the proper altitude/distance (glide slope) as understood by those skilled in the art until the picture of FIG. 11C becomes illustrated. The pilot may continue with the flight path marker 216 on the end 1140 to maintain the proper glide slope. In summary, the emphasis provided by the graphical change of the polygon around the runway aids the pilot in determining a flight path angle to the runway.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A vision system for an aircraft, comprising:

a database storing a position and dimensions of a target runway; a navigation system configured to determine a location of the aircraft; and a display coupled to the database and the navigation system and configured to display a conformal runway representing the target runway and a runway indicator, the conformal runway having an approach end, a departure end, a first side, and a second side, the runway indicator comprising:

a landing zone on the target runway near the approach end;

an outline on the approach end, departure end, first side, and second side of the runway; and a polygon having two sides with a distance therebetween greater than the width of the conformal runway;

wherein the navigation system is further capable of continually modifying and emphasizing the position of the polygon based on the position of the aircraft;

wherein the navigation system is further configured to display at least one deviation bar adjacent the side of the runway as a reference for determining the amount of adjustment in the position of the polygon.

2. The vision system of claim 1 wherein the navigation system is further configured to adjust and emphasize the position of the polygon in a direction parallel with the runway centerline.

3. The vision system of claim 1 wherein the navigation system is further configured to:

provide a touchdown zone for the runway;

calculate a roll-out distance of the aircraft from a landing at the touchdown zone; and display an end of the polygon, farthest from the position of the aircraft, at the distance from the touchdown zone.

4. The vision system of claim 1 wherein the navigation system is further configured to adjust a width and angle of the polygon.

5. The vision system of claim 4 wherein the navigation system is further configured to:

adjust an end of the polygon, farthest from the position of the aircraft, while an end closest to the position of the aircraft remains stationary.

6. The vision system of claim 1 wherein the navigation system is further configured to adjust the position of the polygon in a direction perpendicular or at an angle to the runway centerline.

7. The vision system of claim 1 wherein the display is further configured to display the height of the polygon inversely proportion to the height of the aircraft.

8. The vision system of claim 7 wherein the polygon comprises an approach end and the display is further configured to display the approach end as an aim point for the aircraft in order for the aircraft to reach a desired glide path.

9. A vision system for an aircraft, the vision system comprising:

a runway database comprising lengths, widths, and locations of a plurality of runways;

a navigational system configured to determine data including a position and an altitude of the aircraft, and approach information; and a display coupled to the computer and configured to display the approach information, wherein the approach information comprises:

a target runway, selected from the plurality of runways, including length and width from the runway database; and a runway indicator comprising:

a landing zone;

an outline surrounding edges of the target runway; and a polygon having two sides with a distance therebetween greater than the conformal runway width, and two ends;

wherein the system is further configured to continually modifying the position of the polygon based on the position of the aircraft;

wherein the navigation system is further configured to display at least one deviation bar adjacent the side of the runway as a reference for determining the amount of adjustment in the position of the polygon.

10. The vision system of claim 9 wherein the navigation system is further configured to adjust the position of the polygon in a direction parallel with the runway centerline.

11. The vision system of claim 9 wherein the navigation system is further configured to:

provide a touchdown zone for the runway;

calculate a roll-out distance of the aircraft from a landing at the touchdown zone; and display an end of the polygon, farthest from the position of the aircraft, at the distance from the touchdown zone.

12. The vision system of claim 9 wherein the navigation system is further configured to adjust a width of the polygon.

13. The vision system of claim 12 wherein the navigation system is further configured to:

adjust an end of the polygon, farthest from the position of the aircraft, while an end closest to the position of the aircraft remains stationary.

14. The vision system of claim 9 wherein the navigation system is further configured to adjust the position of the polygon in a direction perpendicular to the runway centerline.

15. A method of providing a runway indicator for assisting a pilot of an aircraft to complete an approach for landing on a recommended approach path, comprising:

providing a location, width, length, and centerline of a runway;

determining a position of the aircraft, the position being determined in consideration of at least one of the group consisting of an altitude of the aircraft and a lateral distance of the aircraft from the runway centerline;

displaying the runway conformally with respect to the position of the aircraft; providing the runway indicator, comprising:

displaying a polygon having two sides with a distance therebetween greater than the width of the runway;

continually adjusting the position of the polygon with respect to the conformal runway in accordance with the position of the aircraft; and displaying at least one deviation bar adjacent the side of the runway as a reference for determining the amount of adjustment in the position of the polygon.

16. The method of claim 15 further comprising adjusting the position of the polygon in a direction parallel with the runway centerline.

17. The method of claim 15 further comprising:

providing a touchdown zone for the runway;

calculating a roll-out distance of the aircraft from a landing at the touchdown zone; and displaying an end of the polygon, farthest from the position of the aircraft, at the distance from the touchdown zone.

18. The method of claim 15 wherein the adjusting step comprises adjusting a width of the polygon.

19. The method of claim 16 wherein the adjusting step further comprises:

adjusting an end of the polygon, farthest from the position of the aircraft, while an end closest to the position of the aircraft remains stationary.

20. The method of claim 15 further comprising adjusting the position of the polygon in a direction perpendicular to the runway centerline.

21. The vision system of claim 15 further comprising displaying the polygon at a height inversely proportion to the height of the aircraft.

22. The vision system of claim 21 wherein the polygon comprises an approach end and the method further comprises displaying the approach end as an aim point for the aircraft in order for the aircraft to reach a desired glide path.

* * * * *